United States Patent [19]

Stieff et al.

[11] 4,445,364
[45] May 1, 1984

[54] METHOD AND APPARATUS FOR MEASURING AIR INFILTRATION RATE INTO BUILDINGS

[75] Inventors: Lorin R. Stieff, Kensington, Md.; John C. Dempsey, Elliottville, N.Y.

[73] Assignee: Taggents, Inc., Kensington, Md.

[21] Appl. No.: 340,589

[22] Filed: Jan. 19, 1982

[51] Int. Cl.³ .............................................. G01M 3/20
[52] U.S. Cl. ..................................... 73/40.7; 222/54; 239/49; 239/53
[58] Field of Search ..................... 73/40.7, 40; 222/54; 239/49, 53, 75, 145

[56] References Cited

U.S. PATENT DOCUMENTS

| | | | |
|---|---|---|---|
| 3,285,470 | 11/1966 | Frei et al. | 222/54 |
| 3,325,318 | 6/1967 | Paullukonix . | |
| 3,342,990 | 9/1967 | Barrington et al. . | |
| 3,578,758 | 5/1971 | Altshuler | 73/40.7 |
| 3,690,151 | 9/1972 | Briggs | 73/40.7 |
| 3,920,987 | 11/1975 | Anbar et al. . | |
| 3,962,916 | 6/1976 | Bouchy et al. | 73/149 |
| 3,991,680 | 11/1976 | Dietz et al. . | |
| 4,016,743 | 4/1977 | Henderson et al. | 73/40.7 X |
| 4,028,928 | 6/1977 | Van Dalen et al. | 73/40.7 |

*Primary Examiner*—Gerald Goldberg
*Assistant Examiner*—Joseph W. Roskos
*Attorney, Agent, or Firm*—James Creighton Wray

[57] ABSTRACT

Sources which emit tracer gas at a known constant rate are positioned throughout a building. Samples of air are collected in selected rooms with constant rate adsorbent samplers. Samplers are analyzed in a laboratory to determine the tracer gas concentration during the period sampled, which concentration is compared to the known volume of the building to determine air infiltration rates. The tracer gas emission rate is rendered independent of room temperature by allowing the gas to escape through specially designed orifices which automatically open and close in response to changes in temperature. In one design, an orifice is formed in a material which expands and contracts with variations in temperature surrounded by a second, less elastic material. In another design, the area of an orifice is changed by a needle valve imbedded in a material which expands and contracts with temperature variations to move the needle in and out of the orifice. In another design, a bimetallic coil is positioned in the bottom of a container for adjusting the length of tracer impregnated material projecting out of an opening in the container. In another design, a bimetallic coil slides a valve which opens and closes an orifice in response to temperature changes. In another design, the bimetallic coil in a circular thermometer is connected to a tracer impregnated wire extending through a rim of an enclosure to adjust the length of wire projecting out of the enclosure. An alternative temperature-independent device uses thermostatically controlled enclosures to maintain constant source temperature.

93 Claims, 17 Drawing Figures

METHOD AND APPARATUS FOR MEASURING AIR INFILTRATION RATE INTO BUILDINGS

BACKGROUND OF THE INVENTION

This invention relates generally to energy conservation in buildings and, more particularly, has reference to the use of tracer gases to measure the infiltration of air into buildings.

There is a growing need to control energy loss in homes and commercial buildings. A substantial energy loss is caused by infiltration of cold air into heated buildings during the winter and infiltration of hot air into cooled buidlings during the summer. Using currently available methods, it is very difficult, time consuming, and costly to measure the amount of such infiltration and to locate the leakage points. It is especially difficult to establish an average leakage value over an extended period of time because the leakage rate changes substantially when weather or temperature changes occur. Most current methods require technicians to come to the building in question and make measurements over an extended period of time using complicated and expensive instruments.

The tracer dilution method is the most common method used today for infiltration rate measurement. It requires the release of a batch of tracer gas, usually sulfur hexafluoride. The gradual reduction in tracer gas concentration caused by air infiltration is measured at several precisely timed intervals. This technique is costly and its accuracy is dependent on the skill of the technician who applies it in the field.

In another technique, called the constant rate method, tracer gas is emitted continuously. The emission rate is varied to maintain a constant concentration of tracer gas in the building or in the room. The emission rate is recorded and used to calculate the infiltration rate according to the recorded emission rate and variations in the emission rate.

SUMMARY OF THE INVENTION

The present invention overcomes many of the problems which exist in the prior art. The invention provides a simple low cost method and apparatus for measuring average building infiltration rates over an extended period of time.

Tracer gas emission sources are placed in a building. The sources are adjusted to emit tracer gas at a substantially constant rate, the rate being related to the volume of the building. The rate is rendered independent of temperature by unique source designs. Thus this new method for measuring infiltration will be referred to as the constant source method.

The tracer gas emission rate is rendered independent of room temperature by allowing the gas to escape through especially designed orifices which automatically open and close in response to changes in temperature. In one design, an orifice is formed in a material which expands and contracts with variations in temperature surrounded by a second, less elastic material. In another design, the area of an orifice is changed by a needle valve imbedded in a material which expands and contracts with temperature variations to move the needle in and out of the orifice. In another design, a bimetallic coil is positioned in the bottom of a container for adjusting the length of tracer impregnated material projecting out of an opening in the container. In another design, a bimetallic coil in a conventional thermometer is connected to a tracer impregnated wire extending through the thermometer enclosure to adjust the length of wire projecting out of the enclosure. An alternative temperatureindependent device uses thermostatically controlled enclosures to maintain constant source temperature.

An adsorbent sampler is used to adsorb tracer gas in the building air at a constant, known rate for a fixed time. The tracer gas is then purged from the adsorbent and the measured quantity is used to calculate the rate of air infiltration into the building during the sampling period.

The method indicates the average infiltration rate over the sampling period, thus providing a long term rate of infiltration value to be obtained for a building which averages out the substantial changes which occur with changes in weather conditions.

An object of the invention is, therefore, to provide an improved method and apparatus for measuring air infiltration into a building.

Another object of the invention is to provide an improved method and apparatus for measuring air infiltration rate which is based upon a constant flow method.

Still another object of the invention is to provide an improved method and apparatus for measuring air infiltration which can be conveniently and cheaply carried out by a homeowner.

Another object of the invention is to provide an improved constant emission rate source of tracer gas useful in a constant flow method for measuring air infiltration rate in buildings.

Yet another object of the invention is to provide a constant emission rate source which can easily be adjusted to provide the proper emission rate for buildings having different volumes.

Yet another object of the invention is to provide a constant emission rate source in which the emission rate is independent of temperature.

A further object of the invention is to provide tracer gas emission apparatus adapted for use in a constant flow method for measuring air infiltration rate into an enclosure comprising a container having an open end, tracer substance in the container and orifice means connected to the open end of the container for varying the diameter of an orifice in response to temperature in the vicinity of the container, said tracer substance escaping from the container through said orifice at a substantially constant rate independent of temperature in the vicinity of the container.

Still another object of the invention is to provide a constant emission rate tracer gas source comprising a polytetrafluoroethylene material impregnated with a perfluorocarbon compound.

A further object of the invention comprises providing a method of measuring the rate at which air is infiltrating into an enclosed area comprising placing in the area a tracer substance, emitting tracer gas over a period of time at a substantially constant rate independent of the temperature in the area, sampling tracer content in the area and measuring tracer in the sample.

Another object of the invention is to provide a method of measuring the rate of air infiltration into an enclosed area comprising placing in the area a small amount of a tracer substance, emitting tracer gas over a period of time at a substantially constant low emission rate which is substantially independent of the temperature in the area, sampling gaseous content of the area at a substantially constant low rate and measuring tracer in the sample.

A still further object of the invention is to provide tracer gas emission apparatus adapted for use in a constant flow method for measuring air infiltration rate into an enclosure comprising a container provided with an orifice configured to permit escape of gas from the container, a solid material which expands and contracts with changes in temperature positioned in the container at a location spaced from the orifice, tracer substance in the container and a needle connected to the solid material and extending into the orifice for adjustably restricting the orifice and thereby controlling the rate of gas escaped from the container.

Another object of the invention is to provide valve means comprising a valve stem embedded in elastomeric material, the stem terminating outwardly in an outwardly tapering needle received in an orifice.

A further object of the invention is to provide a method of measuring air infiltration rate into an enclosed area comprising placing in the area a valved container containing tracer substance, adjusting the container valve to produce a predetermined gas emission rate from the container, emitting gas from the container at a substantially constant rate over a period of time, sampling gaseous content of the area at a substantially constant rate and measuring vaporous tracer in the sample.

Yet another object of the invention is to provide tracer gas emission apparatus adapted for use in a constant flow method for measuring air infiltration rate into an enclosure comprising a container having an opening at an end, a tracer impregnated material positioned in the container and having an end projecting through the opening of the container, positioning means connected to the container and the material for translating the end of the material with respect to the opening in response to temperature in the vicinity of the container, tracer gas being emitted at a substantially constant rate independent of temperature in the vicinity of the container.

Still another object of the invention is to provide a bimetallic coil which moves a tracer impregnated element in and out of an enclosure as a function of temperature.

These and other and further objects and features of the invention are apparent in the disclosure which includes the above and below specifications and claims and drawings.

DETAILED DESCRIPTION OF THE INVENTION

The present invention is based upon a constant source emission rate method for measuring air infiltration (hereafter referred to as the constant source method). It involves the release of a tracer gas into a house or large building at a constant rate and measuring the average concentration over a four to six week period. The rate of infiltration can be calculated from a measurement of the average concentration value during that period. Since the infiltration rate varies in all buildings as weather conditions change, an integrated measurement over an extended period of time is needed to obtain an average value.

The theoretical basis for the constant emission rate method is as follows:

Assume a constant rate of tracer addition throughout a building and a constant rate of the tracer leakage out of the building. The total amount of tracer in the building at any time can be obtained by solving the following differential equations:

$$dA(t)/dt = K - QC(t) \qquad (1)$$

where $A(t)$ is the total amount of tracer in the building at time t, K is the constant rate of tracer addition, Q is the constant volumetric flow rate out of or into a building, and $C(t)$ is the exit concentration of tracer leaving the building at time t. If K and $A(t)$ and $C(t)$ were known for various times, Eq. 1 could be solved and the value of Q could be obtained. This is not practical. It would be virtually impossible to determine the values of $A(t)$ and $C(t)$ because that would involve measuring the tracer and concentration at all positions within the building and exiting from the building simultaneously.

However, if one assumes that the tracer is perfectly mixed throughout the entire building, then a modified formulation can be derived which gives a practical solution. In this case, we can write the differential equation $$dA(t)dT = K - (Q/V)A(t) \qquad (2)$$

where V is the total volume in the building. The term $(Q/V)A(t)$ can be taken as the rate that tracer leaves the building as a direct consequence of the perfect mixing assumption. The solution to Eq. 2 is $$A(t) = (KV/Q)1 - \exp(-Qt/V) \qquad (3)$$

It has been shown that when t is sufficiently large, e.g., when t exceeds about 2 to 3 hours, one can assume that a satisfactory equilibrium condition exists. Hence, this solution reduces to:

$$A(t) = A - KV/Q \qquad (4)$$

Alternatively, one could arrive at the solution of Eq. 4 by assuming that at long times there is no change in the amount of total activity in the house and that $$dA(t)/dt = 0 = k - (Q/V)A(t)$$

or $K = QA/V$ and $A = KV/Q$ (5)

Equation 4 or 5 can be arranged to give $$A/V = K/Q \quad (6)$$

A direct measurement of A/V can be made by obtaining the tracer concentration in the building at any time after the tracer sources have been operating sufficiently long enough to insure that equilibrium has been established.

From the known values of A/V and K, a value of Q can be obtained from a rearrangement of either Eq. 4, Eq. 5, or Eq. 6. The rearrangement gives:

$$Q = KV/A \quad (7)$$

The volume of the building, can be calculated from the known inner dimensions of all the rooms or from the outside dimensions of the building; the "turnover rate" T is simply $$T = Q/V \quad (8)$$

where T is the number of complete air renewals in the building per unit time.

Properly applied, the constant source method can overcome many of the limitations of earlier methods. Moreover, the source and sampling apparatus are small and can be mailed to the home or building owner to carry out the tracer gas release and sampling steps easily, on a "do-it-yourself" basis using simple, low-cost components.

The validity of the constant flow method requires that tracer emission and sampling rates be known absolutely and that they be relatively constant during the measurement period.

The tracer substance can be a pure compound (e.g., a gas or vaporous liquid) or it can be combined with a liquid or gaseous carrier or a solid substrate. Many fluoropolymer solids, such as polytetrafluorouethylene, have been impregnated with certain gases, such as $SF_6$, and many fluoro-elastomers, such as Vitron, that have been impregnated with certain vaporous liquids, such as $SF_6$, and many fluoro-elastomers, such as Vitron, that have been impregnated with certain vaporous liquids, such as perfluorocarbon tracer compound (PFT), will emit them again as gases via diffusion at low but very predictable rates or many years. For example, polytetra-fluoroethylene has been found to emit measurable quantities of $SF_6$ over ten years. The emission rate from several elastomers is predictable over a period of several years.

The present invention provides a method and apparatus for measuring air infiltration rates wherein the tracer emission source emits tracer vapors at a substantially constant rate independent of temperature. The present invention further provides a tracer emission source which is quickly and easily adjusted to provide a desired tracer emission rate corresponding to building volume.

The present invention can be best understood by reference to the drawings.

Figures 1A, 1B, 1C, 1D, 1E:
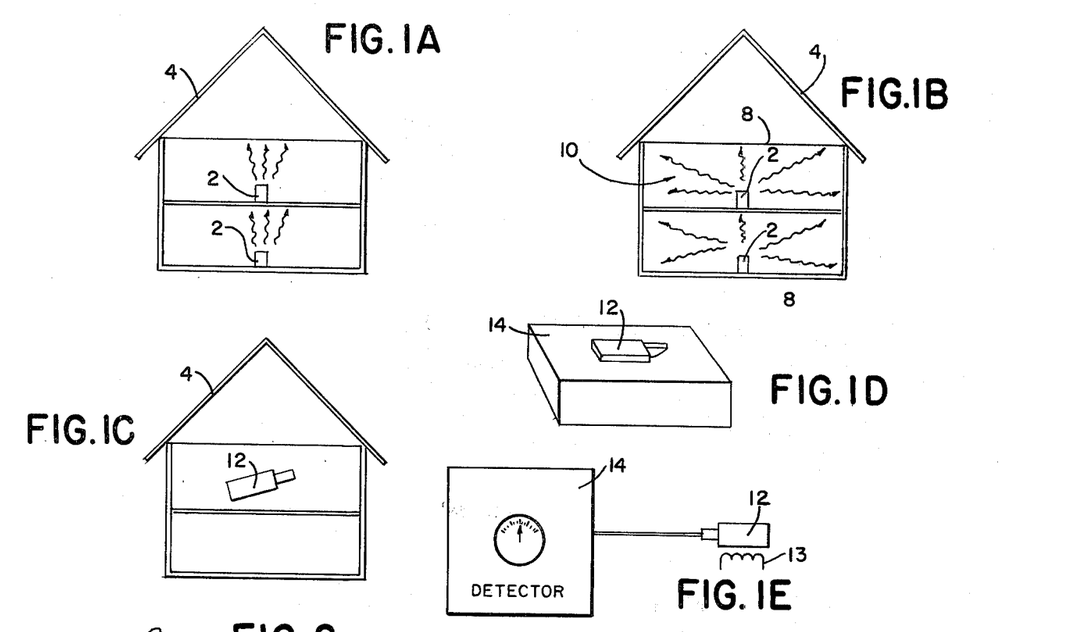
FIGS. 1A–1E are diagrammatic illustrations of steps of the present invention.

In step 1 (FIG. 1A), one or more constant tracer emission sources 2 are placed in a building 4. When several sources are used (as in large buildings) each source 2 is adjusted to emit tracer at a rate corresponding to the volume of the room or block of rooms in which it is placed so as to achieve a homogenous tracer concentration throughout the building. By distributing properly adjusted sources in this way, it is possible to measure infiltration rates for very large multi-room buildings, e.g. apartment buildings.

PFT is the preferred tracer for use in the present invention. However, $SF_6$, or other tracer materials which can be readily sampled or measured at low concentrations, can be used. Several different tracers can be employed simultaneously for special applications.

In step 2 (FIG. 1B), tracer gases 8 are emitted from the sources 2 at a substantially constant rate for a period of at least 4 hours to permit the tracer to mix uniformly with air in the room. The sources 2 are designed to maintain constant emission rate independent of temperature changes in the building 4.

In step 3 (FIG. 1C), gas samples are taken at one or more locations in the building by exposing adsorbent samplers 12 to the tracer gas inside the building 4. By taking a separate sample in each room of the house, it is possible to determine the exact location where infiltration is occuring. The samplers 12 contain an adsorbent material, such as activated charcoal, which absorbs tracer from the air at a substantially constant rate. Sampling in direct proximity to the sources 2 is avoided. The samplers 12 are left in the building 4 long enough to obtain an average infiltration rate through a variety of different weather conditions, 4 to 6 weeks. At the end of that time, the samplers 12 are hermetically sealed and removed from the building 4.

In step 4, (FIG. 1D), the samplers 12 are placed in packages 14 and sent to a laboratory. The samplers 12 needed for testing a home or large building are designed to easily fit into a single small package suitable for shipment. The total volume of the area tested and the exact test period (beginning and ending dates and times) are recorded in or on the package 14.

In step 5 (FIG. 1E), the adsorbent material in the samplers 12 is heated by heater 13 or otherwise treated to release all of the adsorbed tracer gas and transport it into the detector 14 with a carrier gas. The purged tracer gas is quantitatively measured by the detector 14 and compared to the volume of the area. The detector is preferably a commercially available gas chromatograph/ionization detection system.

The air infiltration system into the building is calculated from the data gathered in steps 1-5. The calculations needed were generally discussed above.

It is useful to compare the equipment and procedures needed for the present invention with those needed for the tracer dilution technique.

At least three sampling or measurement steps are needed in the dilution technique. Only one sampling step is required for the present invention. Samples for the dilution method must be measured on the spot in real time or taken and shipped to an analytical lab in large bags because the $SF_6$ gas commonly used will not sorb or desorb readily as will the PFT used in the present invention. The small adsorbent samplers used in the present invention are much more suitable for shipment. Precise timing of each sampling is necessary in the dilution technique. Only the start and finish times of the overall test are necessary in the present invention. Multiple source releases and samplings are required for each dilution run under differing weather conditions, whereas the initial source and sampler positioning in the present invention serves all subsequent tracer concentration samplings. Hundreds of dilution technique measurements would have to be made over the 4 to 6 week period needed to obtain an average infiltration value for a building.

The foregoing advantages of the present invention add significantly to its relative simplicity and thus facilitate its proper application by homeowners on a "do-it-yourself" basis.

Another advantage is the small mailing packages used in the present invention versus the larger package needed for the dilution technique. This, of course, reduces mailing costs.

A further advantage of the present invention derives from the fact that the tracer gas sources emit continuously. This makes it possible to find the location of leaks by "sniffing" inside and outside of the building with a real-time detector while the source is in place.

The ion mobilization instruments used to measure the tracer gas in both the present invention and the dilution technique are 100,000 times more sensitive to the perfluorocarbons used in the present invention than they are to the $SF_6$ used in dilution technique, thus permitting the use of very low tracer concentrations which are harmless to building residents.

Another advantage of the present invention is the fact that it is relatively unaffected by changes in temperature or weather.

Aspects of the present invention will now be described in greater detail.

The preferred tracer or "taggent" used in the present invention is a perfluorocarbon tracer (PFT) compound. The inhalation and oral toxicity of several candidate compounds were analysed. Tables 1 and 2 are preferred for use in the present invention.

TABLE 1

| Inhalation Toxicity Data for Various Taggents | | |
|---|---|---|
| Taggent | Type* | Value |
| HFB | LDLo | 11 ppm for 2 hr in mice |
| OFT | LDLo | 5000 ppm for 10 min in mice |
| DFCH | LCLo | 8000 ppm in mice |
| OFCP | LCLo | 30000 ppm in mice |
| PDCH | No effect | 4% for 6 hr in rats |
| PMCH | No effect | 2% for 6 hr in rats |
| E-1 | No effect | 3.3% for 4 hr in rats |

*LDLo = Lowest Published Lethal Dose
LCLo = Lowest Published Lethal Concentration

TABLE 2

| Oral Toxicity Data for Various Taggents | | |
|---|---|---|
| | Oral | |
| Taggent | White Mice | Toxicity Rating |
| OFN | 670 mg/kg | moderately toxic |
| PFP | 280 mg/kg | very toxic |
| HFB | 710 mg/kg | moderately toxic |
| PMCH | 100 g/kg | practically non-toxic |
| PDCH | 100 g/kg | practically non-toxic |
| Freon E1 | 25 g/kg | practically non-toxic |
| Freon E2 | 25 g/kg | practically non-toxic |
| PFD | 200 g/kg | practically non-toxic |

As shown in the Tables, the perfluoroalkanes are practically non-toxic so these are the preferred taggents. Potential taggents shown on the Table which exhibit some toxicity are not preferred.

$SF_6$ is a known low toxicity taggent. However, it is not preferred in the present invention because there are no suitable adsorbents for sampling it as required in this new technique.

Materials useful as a substrate in the constant emission rate sources for the present invention were discussed earlier. Solid tracer impregnated sources are preferred for their ease of handling. In the preferred embodiment of the invention, the material is an elastomer or fluoropolymer material. Polytetrafluoroethylene has proven to be a particularly effective material. Liquid and gaseous tracers will also suffice and, in fact, have advantages in certain applications of the measurement technique revealed herein.

Relatively low cost equipment is used to impregnate the substrate with the tracer substance to manufacture solid tracer sources. Commercially available compressors and laboratory pressure/temperature bombs can be used to impregnate the substrate with either gaseous or liquid tracer. Experience has shown that such equipment is adequate to accomodate the modest temperature and pressures, e.g., 125 degree C and 15 atms., needed for the impregnation process.

Impregnation temperature, pressure, and timing are all interrelated. The optimum parameters have been well quantified for both gaseous and liquid tracer compounds. Certain preparation procedures can be useful in simplifying control of source emission during production, e.g., impregnating with optimum tracer-solvent mixtures.

Past measurements using the dilution technique have demonstrated that tracer concentrations in upstairs rooms were consistently lower than concentrations in downstairs rooms when the tracer was released downstairs. That is attributable to low convective mixing between the two zones. That problem can be avoided in the present invention by placing sources in each room or at least on each floor. The user simply adjusts each source to produce an equal emission rate in each building volume involved. In this way, an equal tracer concentration is achieved throughout the building. This tailoring of source emission rates to room volumes is very important wherever multiple sources must be deployed, e.g., in measuring the infiltration rate of large buildings.

Normal home temperature variations can alter tracer emission rates in a predictable way. The normal tendency is for the emission rate to increase markedly with a rise in temperature and to decrease with a fall in temperature. Thus, in applications where an appreciable temperature change is expected, means should be provided to minimize the effect. Such means are provided in the present invention through source design.

FIGS. 3A through 12 show tracer emission source configurations which automatically adjust for temperature change to maintain constant emission rates. In addition, the emission rate of all of the tracer gas sources described herein can be readily adjusted by dilution of the tracer compound with suitable materials.

Figure 2:
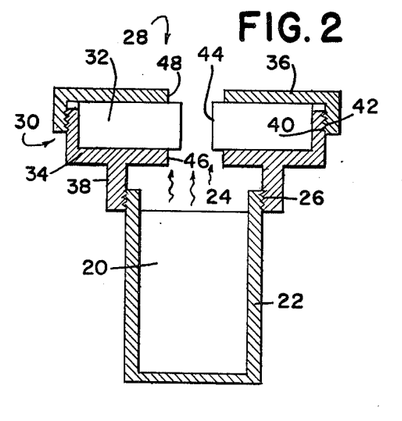
FIG. 2 is a sectional elevation view of a tracer emission source of the present invention.
Figure 3A:
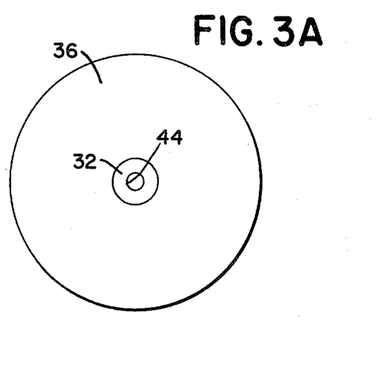
FIGS. 3A and 3B are top plan views of the source shown in FIG. 2 under two different operating conditions.
Figure 3B:
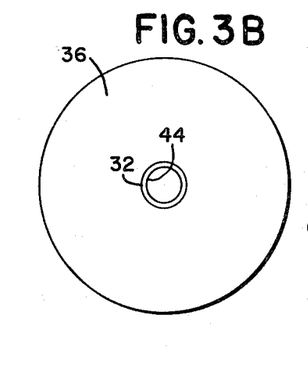

FIGS. 2, 3A and 3B illustrate one source design which compensates for variations in room temperature.

A tracer impregnated substrate 20 is placed in a cylindrical container 22. The open end of the container 22 is provided with screw threads 24 which are designed to matingly engage corresponding screw threads 26 formed on an orifice assembly 28. The screw threads 24 and 26 provide a detachable connection between the container 22 and orifice assembly 28, thereby providing ready access to the contents of the container 22.

The orifice assembly 28 consists of an elastomeric cylindrical disc 32 penetrated axially by a small bore hole 44 orifice and a support assembly 30. The lower surface of disc 32 rests on a horizontal portion of a support member 34. The outer surface of the disc 32 abuts vertical portions of the support member 34. A top member 36 has a horizontal portion which rests on the upper surface of the disc 32 and has a vertical portion detachably connected to the vertical portion of the support member 34.

The detachable connection between the top member 36 and the support member 34 is provided by matingly engaging screw threads 40 and 42 provided on the vertical portions of the support member 34 and top member 36 respectively. The screw threads 40 and 42 permit removal of the top member 36 and elastomeric disc 32 from the support member 34.

The disc 32 is provided with a small bore orifice hole 44. Preferably, the orifice is drilled in the disc. The support member 34 and top member 36 are provided with axial openings 46 and 48 aligned with the orifice 44. The diameter of the openings 46 and 48 is greater than the diameter of the orifice 44 so that the openings 46 and 48 do not restrict the outward diffusion of tracer gas. Tracer gas emitted by the substrate 20 escapes into the atmosphere through the orifice 44 and openings 46 and 48. The diameter of the orifice 44 dictates the emission rate.

The disc 32 is formed of an elastomer material which expands with increasing temperature. The support assembly 30 provides a containment around the disc which forces an expanding disc to flow inwardly and reduce the diameter of the orifice 44. That reduction restricts the outward diffusion of tracer gas and thereby compensates for the temperature related increase in gas emission from the substrate 20. A reduction in temperature causes the elastomer to contract, thereby enlarging the orifice and compensating for the temperature related decrease in emission rate from the substrate 20.

FIG. 3A shows the condition of the orifice 44 at a temperature of about 70 degree F. FIG. 3B shows the conditions of the orifice 44 at a temperature of about 50 degree F. The temperature related difference in orifice diameter is related to the diameter of the disc 32 and to the expansion coefficient of the elastomeric material. Additional orifice closure can be obtained by using a larger diameter disc or by using an elastomeric material with a higher expansion coefficient.

The following rough calculations are given to demonstrate the feasibility of the variable orifice concept. They show that an orifice or capillary of representative dimensions will undergo an area change over a 20 degree F. temperature range which is sufficient to restrict the tracer flow from the source more than two-fold, as required.

An elastomeric disc having a diameter of 1 cm and a height of 0.25 cm has a volume (neglecting the orifice hole volume) of approximately 0.329 cm$^3$.

A typical elastomer with volumetric coefficient of expansion of $60 \times 10^{-4}$ would expand a total of $(60 \times 10^{-4}) (0.392) = 0.0024$ cm$^3$.

The volume of the orifice=0.0039 cm$^3$. Assuming that, as a result of confinement, all of the expansion volume follows inward to reduce the orifice size the reduction in hole area would be 0.0024=61%.

If the diameter of the disc is increased to 2 cm the hole reduction will be 61%×4=244%, indicating that the orfice would be completely closed at 70 degree F.

The assumption that all of the expanding elastomeric material will flow inward to close the orifice is not completely met in practice. Due to compressibility, only a portion of expanded volume will fill the orifice. However, there is an excess closing capacity available to attain the 2 to 2½ fold flow reduction needed. Thus, it is seen that the two-fold emission rate reduction required to compensate for a 20 degree F. temperature increase requires approximately a 75% reduction in the orifice area and 244% is available if a 2 cm orifice is used. Obviously, an optimum intermediate area is available which will compensate exactly for temperature variations.

Figure 4:
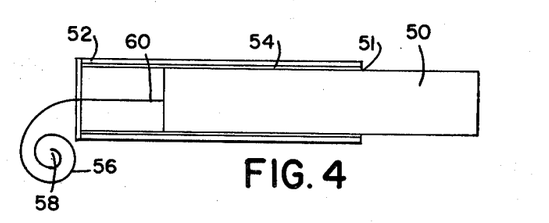
FIG. 4 is a sectional elevation view of another emission source of the present invention.
Figure 5:
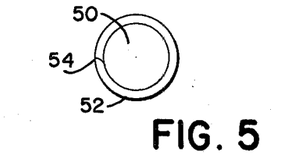
FIG. 5 is a top plan view of the source shown in FIG. 4.

Another temperature compensating source design is shown in FIGS. 4 and 5.

A cylindrical elastomeric rod of tracer impregnated substrate 50 is placed in a cylindrical container 52 having an opening 51 at one end. The diameter of the opening 51 is only slightly larger than the diameter of the substrate 50, thereby causing the substrate 50 to fit snugly within the container 52. A low friction material (e.g. graphite) 54 is provided on the inner surface of the container 52 to facilitate axial translation of the substrate 50 with respect to the container 52.

A bimetallic coil 56 is positioned in the container 52. The radially inward end 58 of the coil is secured to the container 52. The radially outward end 60 of the coil 56 is connected to the end of the substrate 50 received in the container 52. The coil 56 expands or contracts in response to temperature variations. Those expansions and contractions are translated into axial movement of the substrate 50. The axial movement dictates the length of the substrate which projects through the opening 51 and is exposed to the atmosphere. If the substrate 50 is uniformly impregnated with tracer compound, the tracer emission rate from the source will be directly related to the length of the substrate exposed.

Figure 6:
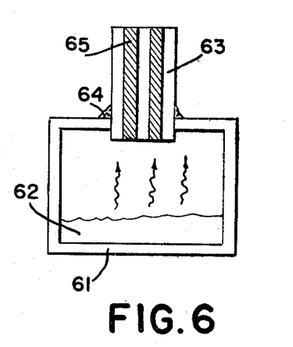
FIG. 6 is a sectional view of another emission source of the present invention.

FIG. 6 shows another temperature independent constant emission rate tracer source based on the same differential expansion principle used in the previous configuration in FIG. 2. The FIG. 6 configuration, however, uses a tubular orifice which yields lower emission rates as required in measuring infiltration rates in small single family dwellings.

Vessel 61 contains the tracer gas source 62. A small bore tube 63 made of a material with relatively low temperature expansion coefficient, such as glass or ceramic, forms the orifice tube support number in this configuration. It is affixed to the source in a leaktight manner with epoxy glue 64A. The entire inner surface of the support member 63 is uniformly coated with a material 65 having a higher temperature expansion coefficient than the support member such that a small, uniform diameter orifice remains for the passage of the tracer gas. The orifice hole can be formed by filling the tube 63 awith a low viscosity thermo-setting material such as metholmethacralate and drilling a small bore hole through it after it solidifies.

Figure 7:
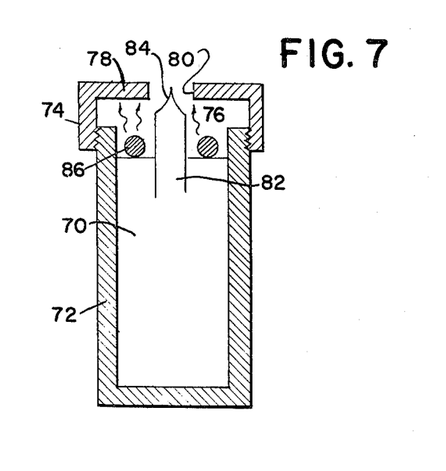
FIG. 7 is a sectional view of another emission source of the present invention.
Figure 8:
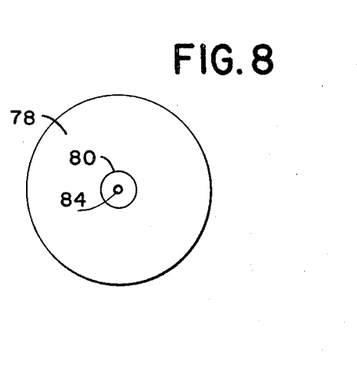
FIG. 8 is a top plan view of the source shown in FIG. 7.

Another temperature-independent constant emission rate souce is shown in FIGS. 7 and 8.

A substrate 70 is placed in a cylindrical container 72. The substrate is formed of an elastomeric material which expands and contracts with changes in temperature. Screw threads 74 provided on the container 72 matingly engage screw threads 76 provided on the vertical portion of the cap 78. An axial orifice 80 is provided in a horizontal portion of the cap 78.

A stem 82 is embedded in the end of the substrate 70 adjacent to the orifice 80. The stem 82 terminates vertically upwardly in a needle 84. The needle 84 is received in the orifice 80.

The tracer impregnated element 86 is positioned on the substrate 70. Preferably, the element 86 is a toroidally shaped piece of elastomeric material which encircles the stem 82. Tracer gas emitted from the element 86 escapes through the orifice 80 and is introduced into the room.

The orfice 80 and needle 84 form a valve which controls the rate at which tracer gas escapes into the atmosphere. When the cap 78 is rotated in one direction, the screw threads 74 and 76 cause the cap 78 to be translated axially toward the substrate 70. The needle 84 projects further into the orifice 80 and reduces the rate at which gas escapes through the orifice 80. When the cap 78 is rotated in the opposite direction, screw threads 74 and 76 cause the cap 78 to be translated axially away from the substrate 70. The needle 84 withdraws from the orifice 80 and allows gas to escape through the orifice 80 at an increased rate.

The needle 84 moves up and down to open and close the orifice 80 with variations in temperature because the stem 82 is anchored in the elastomeric substrate 70 which readily expands and contracts with variations in temperature. The elastomeric material is constrained from moving in any other dimension but upward and toward the orifice and downward by the container 72 which is made of low expansion materials. The needle 84 will move upward to gradually close the orifice 80 as the temperature increases. This valve action will restrict the quantity of tracer gas emitted into the room as the temperature increases. The needle will move downward to gradually open the orifice 80 as the temperature decrease. This valve action will increase the quantity of tracer gas emitted into the room as the temperature decreases. The emission thus remains constant over a range of temperatures.

Figure 9:
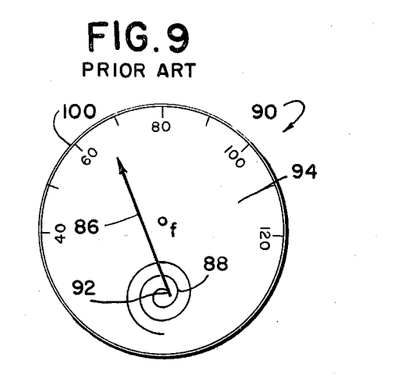
FIG. 9 is an elevational view of a conventional circular thermometer.

Another configuration for maintaining a constant rate of tracer gas emission relies on the same bi-metal motion principle widely used today in circular thermometers. To help understand the principle, FIG. 9 illustrates how this type of thermometer works. By thus adapting these low cost commercial devices to serve as a source for the present invention, a low cost methodology is assured.

The temperature indicator hand 86 is moved by the bimetallic coil element 88 as the element 88 coils and uncoils slightly with changes in temperature. The coil 88 is usually located on the backside of the thermometer 90 and is connected to the hand 86 through a hole 92 in the face 94. The thermometer 90 has a glass cover which forms part of an enclosure 100.

Figure 10:
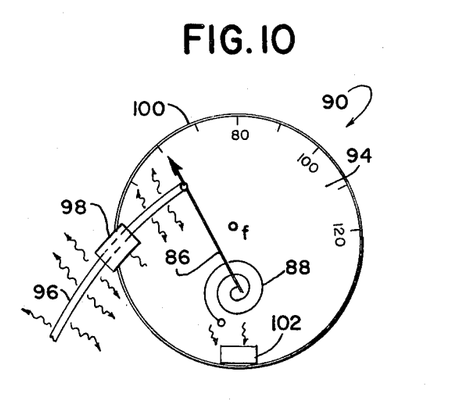
FIG. 10 is an elevational view of another emission source of the present invention.

FIG. 10 shows one way in which the thermometer 90 has been adapted to maintain a constant tracer gas emission rate. It should be remembered that the purpose is to offset the natural tendency of the emission rate to increase as temperature increases, and vica versa.

A small diameter plastic coated wire 96 is impregnated with tracer. The coating is preferably, but not necessarily, polytetrafluoroethylene. One end of the wire 96 is connected to the hand 86 so that it moves through the opening in a small piece 98 of tracer adsorbent material, such as activated charcoal, which extends through the enclosure 100. As the temperature decreases, the hand 86 moves to the left causing more of the wire to move outside of the thermometer enclosure 100. Thus, as the tracer emission rate per unit length of wire 96 diminishes with temperature reduction, the device exposes a greater length of wire 96 as needed to maintain a constant overall emission rate into the room.

The pieces 98 and 102 of adsorbent material capture all excess tracer gas inside the thermometer enclosure 100 so that no tracer emitted within the enclosure 100 escapes into the room.

Using a hole in the piece 98 of the adsorbent as the opening for the wire 96 assures a discreet cut-off point for tracer emission into the room, i.e., the point where the wire emerges into the room. Any tracer emitted from the portion of the wire 96 within the hole will be captured immediately by the adsorbent.

Many other configurations are possible using the metallic expansion principle. The principle will yield any change desired in emission rate as a function of temperature change simply by altering the design of the bi-metal, the lever arm or the orifice apparatus to expose more or less wire at each temperature. This feature permits a design which provides the exponential increase in wire exposure needed to compensate for the expected exponential decrease in tracer emission per unit length of wire due to diffusion.

Figure 11:
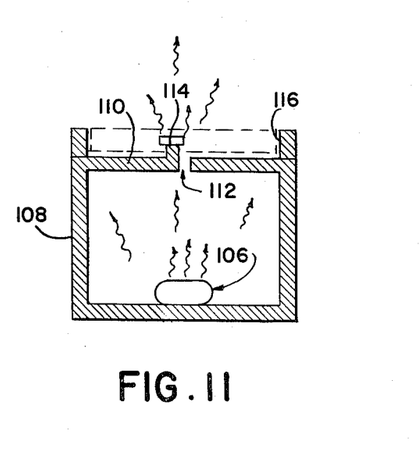
FIG. 11 is a sectional elevation view of another emission source of the present invention.
Figure 12:
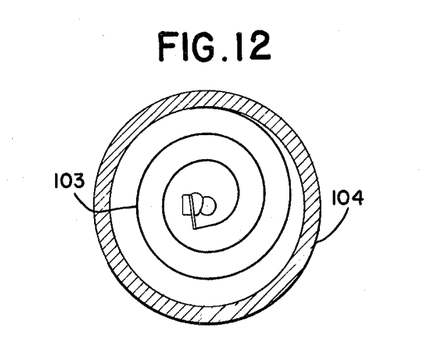
FIG. 12 is a top plan view of the source shown in FIG. 11.

Another temperature-independent constant emission rate source using the bi-metallic principle is shown in FIGS. 11 and 12.

A tracer impregnated source 106 is positioned in an enclosure 108. The end 110 of the enclosure 108 is provided with an orifice 112 which permits tracer to escape from the enclosure 108. A valve element 114 is constrained for sliding movement across the orifice 112. The element 114 is connected to the end of a bi-metallic coil 103 positioned on the end 110 of the enclosure 108. Radially outward portions of the coil 102 abut an annular shoulder 116 formed about the periphery of the end 110.

The temperature caused movement of the coil 102 slides the valve element 114 to open and close the orifice 104 and thereby obtain a desired tracer emission vs. temperature relationship. The orifice and the closing member can be formed in different shapes and moved in different ways to give any desired emission vs. temperature function.

Another temperature-independent constant emission rate source uses a relatively small container holding a relatively small amount of tracer gas under relatively low pressure. Because of the extremely small amount of tracer needed in the present invention, a 100 ml. cyclinder containing 0.01% (volume) PFT at 10 psi can emit the amount of tracer gas needed (1 nanoliter/minute) for a six week infiltration measurement. Calculations indicate that the PFT emission rate from such a gas source would vary only ±1.9% for a temperature variation of 20 degree F. The 1 nanoliter/minute emission rate needed for this source configuration can be obtained by using a porous glass orifice or capillary. The porous glass material is available commercially. The emission rate of this type source can be varied by changing either the diameter or the thickness of the porous glass orifice.

Another constant emission source uses an AC operated thermostatically controlled enclosure which maintains the source at a near-constant temperature slightly above 75 degree F. over the 25 degree F. range of temperature change normally encountered in buildings.

The unit will maintain the temperature of a small tracer source to within ±2 degree C.

Much of the tracer measurement technology used in the present invention has been developed. For example, passive diffusion (PD) samplers are the preferred method of tracer sampling in the present invention.

PD samplers require no outside power source. Rather, the tracer gas moves into the device by well known principles of gas diffusion; i.e., the tracer diffuses into the device to equilibrate the inside as outside concentrations according to Fick's Diffusion Law. However, as tracer molecules reach the adsorbent inside, they are immediately captured so that the higher outside tracer concentration is never reached inside the device. Thus, a continuous pumping action is effected. The theory for the design of such samplers is well known.

Such PD samplers are now commercially available as personal monitoring badges which are worn by workers to determine their exposure to certain noxious gases over an eight hour period. However, the sampling rate for the present invention must be low enough so that sampling continuously for four to six weeks will not saturate the adsorbent material. This is accomplished by reducing the size of the opening through which the tracer substance enters the device.

The resulting samplers are small, low in cost, rugged and can be sent to users by mail. They are not affected appreciably by the changes in surrounding temperature or barametric pressure. Accordingly, they are well suited for use in the present invention.

However, other constant rate samplers such as low volume positive displacement pump samplers will also serve the continuous flow infiltration revealed here.

The sampler design must provide means of purging the tracer from the adsorbent and for hermetically sealing off the adsorbent before and after sampling. The design is preferably compatible with an automatic purging/measuring system. Such systems can automatically heat, purge and measure several samplers per hour. The required design can be accomplished by providing (1) a connecting tube on the bottom of the sampler (2) a removable and penetrable stopper for purging on the top (entrance) and (3) a penetrable seal at the bottom.

Methods and apparatus useful in the tracer purging step are well known for PFT removal from charcoal. Accordingly, activated charcoal is the preferred adsorbent.

While the invention has been described with reference to specific embodiments, the exact nature and scope of the invention is identified in the following claims.

We claim:

1. Tracer emission apparatus adapted for use in a constant flow method for measuring air infiltration rate into an enclosure comprising;
    a container,
    tracer substance in the container, and
    orifice means connected to the container for varying the diameter of an orifice in response to temperature in the vicinity of the container, said tracer substance escaping from the container through said orifice at a substantially constant rate independent of temperature in the vicinity of the container.

2. The apparatus of claim 1 wherein the orifice means comprises elastomeric material provided with an orifice configured to permit diffusion of tracer gas through the orifice means.

3. The apparatus of claim 2 wherein the elastomeric material is material adapted to vary volume in response to temperature changes.

4. The apparatus of claim 3 wherein the elastomeric material is a disc of material provided with an axial orifice configured to permit diffusion of tracer gas through the orifice means.

5. The apparatus of claim 1 wherein the orifice means comprises;
    a support configured to engage the container, said support being provided with an opening, and
    elastomeric material supported adjacent the opening, said material being provided with an orifice configured to permit diffusion of tracer gas through the orifice means.

6. The apparatus of claim 5 wherein the opening is an axial opening and the orifice is an axial orifice.

7. The apparatus of claim 5 wherein the elastomeric material is adapted to vary volume in response to temperature changes.

8. The apparatus of claim 1 wherein the orifice means comprises:
    a horizontal support member connected to the container, said member being provided with an axial opening, and
    a disc of elastomeric material supported on the support member, said disc being provided with an axial orifice aligned with the axial openings and having a diameter less than the diameter of the axial opening.

9. The apparatus of claim 8 wherein the horizontal support member is provided with vertical connecting members configured to engage the container.

10. The apparatus of claim 8 wherein the elastomeric material is adapted to vary volume in response to temperature changes.

11. The apparatus of claim 1 wherein the orifice means comprises:
    a support member connected to the container, said support member having a horizontal portion provided with an axial opening and a vertical portion extending upwardly from the outer edge of the horizontal portion,
    a disc of elastomeric material supported on the support member and bearing against the inner surface of the vertical portion, said disc being provided with an axial orifice aligned with the axial opening and having a diameter less than the diameter of the axial opening, and
    a top member having a horizontal portion and a vertical portion connected to the outer edge of the horizontal portion, the horizontal portion of the top member bearing against the upper surface of the disc and being provided with an axial opening aligned with the axial orifice having a diameter greater than the diameter of the orifice, the vertical portion of the top member being connected to the vertical portion of the support member.

12. The apparatus of claim 11 wherein the vertical portion of the top member is detachably connected to the vertical portion of the support member.

13. The apparatus of claim 11 wherein the vertical portion of the support member is provided with screw threads configured to matingly engage screw threads provided on the vertical portion of the top member.

14. The apparatus of claim 13 wherein the screw threads are provided on an outer surface of the vertical portion of the support member and the screw threads are provided on an inner surface of a vertical portion of the top member.

15. The apparatus of claim 11 wherein the support member is further provided with a connecting member extending vertically downwardly from the lower surface of the horizontal portion of the support member, said connecting member being configured to engage the container.

16. The apparatus of claim 15 wherein the connecting member is detachably connected to the container.

17. The apparatus of claim 15 wherein the connecting member is provided with screw threads configured to magingly engage screw threads provided on the container adjacent the open end.

18. The apparatus of claim 11 wherein the elastomeric material is adapted to vary volume in response to temperature changes.

19. The apparatus of claim 1 wherein the tracer substance is impregnated in solid material positioned in the container.

20. The apparatus of claim 19 wherein the solid material comprises fluoropolymer material.

21. The apparatus of claim 19 wherein the solid material comprises polytetrafluoroethylene material.

22. The apparatus of claim 19 wherein
the solid material comprises polytetrafluoroethylene material, and
the tracer substance comprises a perfluorocarbon compound.

23. The apparatus of claim 1 wherein the tracer substance comprises a perfluoronated compound.

24. The apparatus of claim 1 wherein the tracer substance comprises a perfluorocarbon compound.

25. The apparatus of claim 1 wherein the orifice means comprises a smal bore tube formed of material having a relatively low temperature expansion coefficient, the inner surface of said tube being coated with a material having a higher temperature expansion coefficient then the tube.

26. The apparatus of claim 25 wherein the tube is sealingly connected to the container.

27. The apparatus of claim 25 wherein the high temperature material is metholmethacralate.

28. A method of measuring an infiltration rate into an enclosed area comprising;
placing tracer substance in the area,
emitting tracer gas over a period of time at a substantially constant rate independent of the temperature in the area,
sampling gaseous content of the area, and
measuring tracer in the sample.

29. The method of claim 28 wherein the placing step comprises placing in the area an elastomeric material impregnated with tracer substance.

30. The method of claim 29 wherein the elastomeric material comprises fluoropolymer material.

31. The method of claim 29 wherein the elastomeric material comprises polytetrafluoroethylene material.

32. The method of claim 29 wherein the elastomeric material comprises polytetrafluoroethylene material, and
the tracer substance comprises a perfluorocarbon compound.

33. The method of claim 28 wherein the tracer substance comprises a perfluoronated compound.

34. The method of claim 28 wherein the tracer substance comprises a perfluorocarbon compound.

35. A method of measuring air infiltration rate into an enclosed area comprising;
placing a small amount of tracer substance in the area,
emitting tracer gas over a period of time at a substantially constant low rate of about 1 nanoliter per minute which is substantially independent of the temperature in the area,
sampling gaseous content of the area, and
measuring tracer in the sample.

36. The method of claim 35 wherein the placing step comprises placing in the area a small amount of elastomeric material impregnated with tracer substance.

37. The method of claim 36 wherein the elastomeric material comprises flouropolymer material.

38. The method of claim 36 wherein the elastomeric material comprises polytetrafluoroethylene material.

39. The method of claim 36 wherein the elastomeric material comprises polytetrafluoroethylene material and the tracer substance comprises a perfluorocarbon compound.

40. The method of claim 35 wherein the tracer substance comprises a perfluoronated compound.

41. The method of claim 35 wherein the tracer substance comprises a perfluorocarbon compound.

42. Tracer emission apparatus adapted for use in a constant flow method for measuring air infiltration rate into an enclosure comprising:
a container provided with an orifice configured to permit escape of gas from the container,
material positioned in the container, said material being material adapted to vary volume in response to temperature changes,
tracer substance in the container, and
valve means connected to the material and extending into the orifice for varying restriction of the orifice in response to temperature and thereby controlling the rate of tracer gas escape from the container.

43. The apparatus of claim 42 wherein the valve means comprises a valve stem imbedded in the material, the stem terminating outwardly in an outwardly tapering needle received in the orifice.

44. The apparatus of claim 42 wherein the valve means comprises a valve stem imbedded in the material, the valve stem terminating outwardly in an outwardly tapering needle received in the orifice, the diameter of the needle portion received in the orifice increasing as the distance between the orifice and athe material is decreased, thereby increasing orifice restriction.

45. The apparatus of claim 42 wherein the valve means comprises a valve stem imbedded in the material, the valve stem terminating outwardly in an outwardly tapering needle received in the orifice, the diameter of the needle portion received in the orifice decreasing as the distance between the orifice and the material is increasing, thereby decreasing orifice restriction.

46. The apparatus of claim 42 wherein the tracer substance is impregnated in solid material.

47. The apparatus of claim 46 wherein the solid material comprises elastomeric material.

48. The apparatus of claim 46 wherein the solid material comprises fluoropolymer material.

49. The apparatus of claim 46 wherein the solid material comprises polytetrafluoroethylene material.

50. The apparatus of claim 46 wherein the tracer substance comprises a perfluoronated compound.

51. The apparatus of claim 46 wherein the tracer substance comprises a perfluorocarbon compound.

52. The apparatus of claim 46 wherein the solid material comprises a torus encircling the valve means.

53. The apparatus of claim 42 wherein the container comprises:
   a support position having an open end, the support portion being configured to receive the material, and
   a cap portion configured to engage the open end of the support portion, said orifice being provided in said cap portion.

54. The apparatus of claim 53 wherein the cap portion configured to detachably engage the open end.

55. The apparatus of claim 53 wherein the cap portion is adjustably connected to the open end to permit adjustment of the distance between the orifice and the material, thereby adjusting the restriction of the orifice.

56. The apparatus of claim 42 wherein the container comprises:
   a cylindrical support portion having an open end, the support portion being configured to receive the material, and
   a cap portion configured to engage the open end of the support portion, said orifice being provided in said cap portion.

57. The apparatus of claim 56 wherein the cap portion is configured to detachably engage the open end.

58. The apparatus of claim 56 wherein the cap portion is provided with screws configured to matingly engage screw threads on the support portion to permit adjustment of the distance between the orifice and the material, thereby adjusting restriction of the orifice.

59. The apparatus of claim 58 wherein the cap portion is provided with screw threads on an inner surface and the support portion is provided with screw threads on an outer surface.

60. A method of measuring air infiltration rate into an enclosed area comprising:
   placing in the area a valved container containing tracer substance,
   adjusting the container valve to produce a predetermined tracer emission rate from the container,
   emitting tracer gas from the container at a substantially constant rate over a period of time,
   sampling gaseous content of the area, and
   measuring tracer in the sample.

61. The method of claim 60 wherein the predetermined emission rate corresponds to th volume of the enclosed area.

62. The method of claim 60 wherein the container contains elastomeric material impregnated with tracer substance.

63. The method of claim 62 wherein
   the elastomeric material comprises polytetrafluoroethylene material, and
   the tracer substance comprises a perfluorocarbon compound.

64. A method of emitting tracer gas into an enclosed area at a substantially constant rate independent of temperature comprising:
   placing in the area a container containing tracer substance, said container being provided with an orifice through which tracer gas escapes from the container,
   automatically adjusting orifice size in response to temperature to maintain constant tracer emission rate.

65. The method of claim 64 wherein the adjusting step comprises automatically adjusting orifice diameter.

66. The method of claim 64 wherein the adjusting step comprises varying the extent to which a tapered needle is received within the orifice, thereby varying orifice restriction.

67. Tracer emission apparatus adapted for use in a constant flow method for measuring air infiltration rate into an enclosure comprising:
   a container provided with an opening,
   a solid material positioned in the container and having an end projecting through the opening, said material being impregnated with tracer substance, and
   positioning means connected to the container and the solid material for translating the end of the solid material with respect to the opening in response to temperature in the vicinity of the container, said tracer substance being emitted at a substantially constant rate independent of temperature in the vicinity of the container.

68. The apparatus of claim 67 wherein the positioning means comprises a bimetallic element having a first end connected to the container and a second end connected to said solid material.

69. The apparatus of claim 67 wherein the positioning means comprises a bimetallic coil having a radially inward end connected to the container and a radially outward end connected to the end of the solid material remote from the end projected through the open end of the container.

70. The apparatus of claim 67 wherein the container is provided with a carbon lining.

71. The apparatus of claim 67 wherein the solid material comprises fluoropolymer material.

72. The apparatus of claim 67 wherein the solid material comprises polytetrafluoroethylene material.

73. The apparatus of claim 67 wherein the tracer substance comprises a perfluoronated compound.

74. The apparatus of claim 67 wherein the tracer substance comprises a perfluorocarbon compound.

75. The apparatus of claim 67 wherein the solid material comprises polytetrafluoroethylene material, and the tracer substance comprises a perfluorocarbon compound.

76. Tracer emission apparatus adapted for use in a constant flow method for measuring air infiltration rate into an enclosed area comprising;
   an enclosure provided with an opening,
   a lever pivotally mounted in the enclosure,
   tracer impregnated material having a first end connected to the lever and having a second end projecting through the opening, and
   positioning means connected to the lever for pivoting the lever in response to temperature thereby adjusting the length of said material projecting through said opening.

77. The apparatus of claim 76 wherein the positioning means comprises a bimetallic element.

78. The apparatus of claim 76 wherein the positioning means comprises a bimetallic coil having a radially inward end connected to the lever and a radially outward connected to the enclosure.

79. The apparatus of claim 76 further comprising adsorbent material positioned about said opening, the tracer impregnated material projecting through said adsorbent material.

80. The apparatus of claim 79 wherein the adsorbent material comprises activated charcoal.

81. The apparatus of claim 76 further comprising adsorbent material positioned in the enclosure, said adsorbent material adsorbing tracer emitted from the tracer impregnated material within the enclosure.

82. The apparatus of claim 76 wherein the tracer impregnated material comprises plastic coated wire impregnated with tracer.

83. The apparatus of claim 82 wherein said plastic coating is formed of polytetrafluoroethylene material.

84. The apparatus of claim 76 wherein the adsorbent material comprises a cylinder of material provided with an axial bore configured to receive the tracer impregnated material, said adsorbent material being received within said opening in said enclosure.

85. Tracer emission apparatus adapted for use in a constant flow method for measuring air infiltration rate into an enclosed area comprising;
an enclosure provided with an opening configured to permit escape of tracer gas from the enclosure,
tracer substance positioned in the enclosure,
a valve element movably mounted on the enclosure adjacent the opening for covering portions of said opening and thereby controlling escape of tracer through the opening,
positioning means connected to the valve element for moving the valve element in response to temperature, said tracer thereby being emitted from said opening at a substantially constant rate independent of temperature.

86. The apparatus of claim 85 wherein the enclosure is provided with an outwardly extending annular shoulder concentrically spaced about the opening, and
the positioning means comprises a bimetallic coil having radially outward portions bearing against said shoulder and having radially inward portions connected to the valve element.

87. The apparatus of claim 85 wherein the valve element comprises a plate constrained for slidng movement across said opening.

88. The apparatus of claim 85 wherein the valve element comprises a pivotally mounted plate.

89. The apparatus of claim 85 wherein the tracer substance is impregnated in solid material.

90. Tracer emission apparatus for use in a constant flow method for measuring air infiltration rate in an enclosure comprising:
a container, tracer substance in the container, and release means associated with the container to maintain tracer released from the container at a constant rate independent of ambient temperature.

91. Tracer emission apparatus of claim 90 wherein the release means comprises a source of heat associated with the container to maintain temperature of the tracer substance constant irrespective of ambient temperature.

92. Tracer emission apparatus of claim 90 wherein the release means comprises means to vary size of an orifice in the container inversely according to ambient temperature.

93. Tracer emission apparatus of claim 90 wherein the release means comprises means to expose tracer substance from the container.

* * * * *